Figure 1:
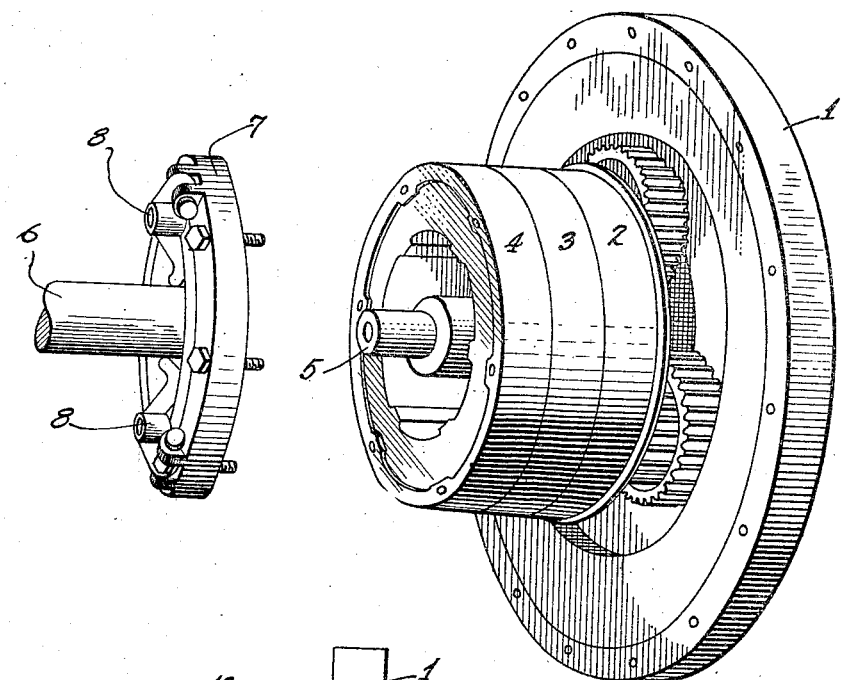

May 18, 1926.

M. CHAMBERLAIN 1,585,082

TRANSMISSION BRAKE

Filed August 29, 1925

INVENTOR.
Morris Chamberlain
BY
ATTORNEYS.

Patented May 18, 1926.

1,585,082

UNITED STATES PATENT OFFICE.

MORRIS CHAMBERLAIN, OF CHESTER, NEW JERSEY.

TRANSMISSION BRAKE.

Application filed August 29, 1925. Serial No. 53,288.

This invention relates to the transmissions of Ford automobiles. In the Ford car, the transmission includes three bands, all of equal width and each of which cooperates with a drum. That is to say, there is a reverse drum, a slow speed drum, and a brake drum having bands cooperating therewith and all of the same width. To the rear of the brake drum, a driving plate is firmly affixed.

It is well known to drivers of Ford cars that the brake band will wear out in a much shorter time than the so-called speed bands which cooperate with the other two drums. This is because the brake band is subjected to the most severe service. The more experienced drivers generally attempt to equalize the wear on the parts by using the low speed band for braking purposes at times and in some instances the reverse band is employed for braking purposes, but these latter practices are detrimental to the mechanism of the car and should not be attempted, except in cases of emergency. The fact remains that when the car is used as intended, the brake band will wear out long before the other bands are sufficiently worn to warrant their replacement, and such band has to be relined or the other bands must be employed for braking purposes.

With these considerations in mind, the object of the present invention is to provide a more reliable, substantial and durable brake than the stock brake of the Ford transmission and to accomplish this result without appreciably changing the construction of the stock parts.

In practically carrying out the invention, I have discovered that this result may be accomplished by substituting for the driving plate of the Ford transmission a combined supplemental brake drum and driving plate, the face of said supplemental brake drum being of appreciable width. The supplemental drum and brake drum are of the same diameter so that when they are secured together as normal, their combined width will be considerably in excess of the braking surface afforded by the stock drum. A brake band of corresponding width cooperates with the brake drum and the braking surface of the supplemental drum and is suitably lined, so that the braking surface thus afforded by the addition of the peripheral surface of the supplemental drum will so distribute the wear as to minimize such wear. In practice, I have found that when this invention is employed, in the normal manner, that brake bands will last as long as the slow speed and reverse bands, and, accordingly, the cost of replacements is minimized and the time incident to the making of frequent replacements as heretofore is saved.

Features of the invention, other than those specified, will be apparent from the hereinafter detailed description and claims, when read in conjunction with the accompanying drawings.

The accompanying drawing illustrates one practical embodiment of the invention, but the construction therein shown is to be understood as illustrative, only, and not as defining the limits of the invention.

Figure 2:
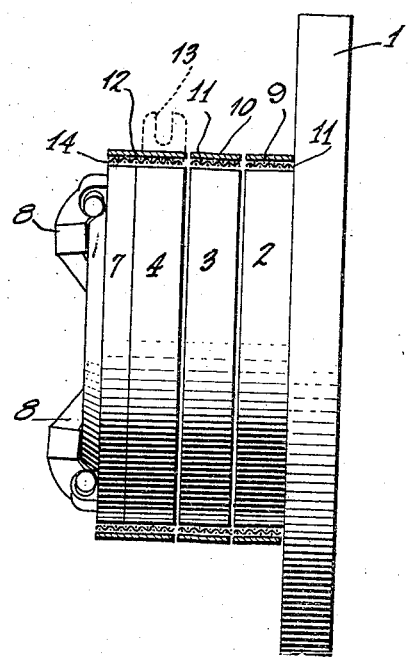

Figure 1 shows in perspective certain cooperating parts of Ford transmission mechanism having the present invention incorporated therein. In this view, the driving plate is shown as removed from the brake drum in the interest of clearness; and, Figure 2 is a side elevation of the parts with the driving plate attached to the brake drum and in this view the bands and their linings are shown in section.

In the showing of the drawings, 1 designates a fly wheel, 2 the reverse drum, 3 the slow speed drum, 4 the brake drum, 5 the transmission shaft and 6 the main drive shaft. All these parts are the same as in the Ford stock car and do not embody the invention.

In accordance with Ford construction, the driving plate is secured to the end of the main drive shaft 6 and is bolted to the brake drum. This plate is, in the stock car, a thin plate having just sufficient thickness to embody the necessary structural strength.

In accordance with the present invention, in contra-distinction, the driving plate, which bears the reference character 7, is made with a relatively wide face shown in the drawings as almost half as wide as the face of the brake drum 4, although, in practice, it may be made either wider or narrower than in the proportion stated.

The drive plate 7 has associated therewith the mechanical parts common to the stock plate including the clutch fingers 8, etc., and is made of the same diameter as the drum 4, so that when secured to the end of the brake drum 4, the outer periphery of the drive plate will form a continuation of the outer periphery of the brake drum, as clearly appears from Figure 2.

From this latter figure, it will be seen that the aggregate width of the driving plate 7 and brake drum 4, the faces of both of which constitute collectively a braking surface, is considerably greater than the face of either the slow speed drum 3 or the reverse drum 2. Moreover, there is, in the proportions shown, in the drawings, an increase of 50 percent in braking surface by the addition of the periphery of the driving plate to the brake drum. Bands 9 and 10 provided with suitable lining 11, cooperate with the two drums 2 and 3, but a relatively wide brake band 12 having a correspondingly wide lining 14 cooperates with the drum 4 and plate 7.

In practice, the invention may be incorporated in a stock car by simply substituting the wide face driving plate and the wide face brake band 12 with its lining 14 for the corresponding stock parts. This can be done in a few minutes. The position of the clutch fingers with respect to the operating mechanism is not changed nor is the position of the brake pedal changed as the operating ears of the band 12 are in practice placed adjacent one edge of the band 12, as shown in dotted lines at 13 in Figure 2, so that they there occupy the position which they occupy in a stock car. It therefore follows that in adapting the invention to any stock car of the make under consideration only two parts need to be changed and this is accomplished by simply taking out the stock driving plate and brake band and substituting the plate and band of my invention.

The plate 7 is made of sufficient width that it will constitute, in effect, a brake drum in itself and inasmuch as it preferably has a narrower face than the brake drum 4, I prefer to term it a supplemental drum.

It will thus appear that in accordance with the present invention, the drive plate serves a dual purpose to which it has heretofore not been put, in that it not only serves its normal purpose of driving, but it constitutes in itself a supplemental brake drum. Wear on the brake band is minimized and inasmuch as the braking surface is greatly increased, the relining is not nearly so necessary at frequent intervals as was formerly the case. The present invention therefore produces marked economy and its installation is inexpensive.

Having thus fully described the invention, what I claim as new and desire to secure by Letters Patent is:

1. Transmission mechanism embodying a brake drum a reverse drum, a slow speed drum and a supplemental brake drum, all of which are coaxial and the latter of which also serves the purpose of a drive plate and is of the same diameter as the brake drum and is secured thereto, a band cooperating with each of the reverse and low speed drums, and a single band collectively cooperating with both the brake drum and the supplemental brake drum.

2. Transmission mechanism for Ford cars embodying a brake drum, a driving plate secured to the brake drum in alinement therewith, said driving plate being of the same diameter as the brake drum and having a relatively wide surface forming a continuation of the surface of the brake drum, whereby said driving plate constitutes a supplemental brake drum, and a single brake band provided with a suitable lining simultaneously cooperating with both the brake drum and the supplemental brake drum.

3. Ford transmission mechanism embodying a brake drum, a supplemental brake drum positioned coaxially with the brake drum and secured thereto, a transmission shaft secured to the supplemental brake drum, clutch operating fingers also mounted on the supplemental brake drum, and a suitably lined brake band common to both the brake drum and supplemental brake drum and simultaneously cooperable with both.

In testimony whereof I have signed the foregoing specification.

MORRIS CHAMBERLAIN.